(12) United States Patent
Kohler et al.

(10) Patent No.: US 9,809,929 B2
(45) Date of Patent: Nov. 7, 2017

(54) POLYESTER FOR THE PAPER INDUSTRY

(71) Applicant: CLARIANT INTERNATIONAL LTD., Muttenz (CH)

(72) Inventors: Achim Kohler, Heilbronn (DE); Roman Morschhaeuser, Mainz (DE); John Stuart Cowman, Bradford (GB); Antonella Leone-Kammler, Muenchenstein (CH)

(73) Assignee: ARCHROMA IP GMBH, Reinach (CH)

( * ) Notice: Subject to any disclaimer, the term of this patent is extended or adjusted under 35 U.S.C. 154(b) by 345 days.

(21) Appl. No.: 14/421,601

(22) PCT Filed: Aug. 3, 2013

(86) PCT No.: PCT/EP2013/002331
§ 371 (c)(1),
(2) Date: Feb. 13, 2015

(87) PCT Pub. No.: WO2014/029468
PCT Pub. Date: Feb. 27, 2014

(65) Prior Publication Data
US 2015/0204018 A1 Jul. 23, 2015

(30) Foreign Application Priority Data
Aug. 18, 2012 (DE) .......... 10 2012 016 461

(51) Int. Cl.
| | | |
|---|---|---|
| D21H 17/53 | (2006.01) | |
| D21H 11/14 | (2006.01) | |
| C08G 63/672 | (2006.01) | |
| D21C 5/02 | (2006.01) | |
| D21H 21/16 | (2006.01) | |

(52) U.S. Cl.
CPC .......... *D21H 17/53* (2013.01); *C08G 63/672* (2013.01); *D21C 5/022* (2013.01); *D21H 11/14* (2013.01); *D21H 21/16* (2013.01); *Y02W 30/648* (2015.05)

(58) Field of Classification Search
None
See application file for complete search history.

(56) References Cited

U.S. PATENT DOCUMENTS

| | | | | |
|---|---|---|---|---|
| 5,142,020 A | * | 8/1992 | Kud ...................... | C11D 3/3715 510/299 |
| 5,415,739 A | | 5/1995 | Furman, Jr. et al. | |
| 6,153,723 A | * | 11/2000 | Lang ...................... | C11D 3/0031 510/108 |
| 2011/0180226 A1 | * | 7/2011 | Gray ...................... | D21H 17/53 162/164.7 |

FOREIGN PATENT DOCUMENTS

| | | | | |
|---|---|---|---|---|
| DE | 1194363 B | 6/1965 | | |
| DE | EP 0442101 A1 | * 8/1991 | .......... | C08G 63/668 |
| DE | 19826356 A1 | 12/1999 | | |
| DE | 102007051279 A1 | 4/2009 | | |
| DE | 102008023803 A1 | 11/2009 | | |
| EP | 0964015 A1 | 12/1999 | | |
| WO | 2009138177 A1 | 11/2009 | | |
| WO | 2011015297 A1 | 2/2011 | | |

OTHER PUBLICATIONS

International Preliminary Report of PCT/EP2013/002331 dated March 5, 2015.
International Search Report from corresponding PCT/EP2013/002331, dated Oct. 10, 2013.

\* cited by examiner

*Primary Examiner* — Christopher M Rodd
(74) *Attorney, Agent, or Firm* — McBee, Moore Woodward & Vanik IP, LLC

(57) ABSTRACT

The invention relates to the use of polyesters for increasing the surface tension and improving the hydrophilic behavior of hydrophobic surfaces, wherein said polyesters are obtainable by polymerization of a) one or more unsulfonated aromatic dicarboxylic acids and/or salts thereof and/or anhydrides thereof and/or esters thereof, and b) ethylene glycol, c) 1,2-propylene glycol, and d) one or more polyalkylene glycols, and e) one or more compounds of formula (1)

$$R^1O(CHR^2CHR^3O)_nH \qquad (1)$$

where $R^1$ is a linear or branched, saturated or unsaturated alkyl group of 1 to 22 carbon atoms, preferably methyl, $R^2$ and $R^3$ are each independently hydrogen or an alkyl group of 1 to 4 carbon atoms, preferably hydrogen and/or methyl, and n is from 1 to 50, f) in the presence or absence of one or more crosslinking compounds having 3 to 6 functions capable of polycondensation, especially acid, alcohol or ester functions, with the proviso that said components d) are used in weight quantities <80%, based on the weight quantity of the polyesters obtained by the polymerization.

19 Claims, No Drawings

POLYESTER FOR THE PAPER INDUSTRY

CROSS REFERENCE TO RELATED APPLICATIONS

This application is a §371 National Stage Application of PCT/EP2013/002331, filed Aug. 3, 2013, which claims priority to DE 102012016461.0, filed Aug. 18, 2012.

BACKGROUND

Field of the Invention

This invention relates to the use of polyesters for modifying hydrophobic surfaces, especially in paper- and board-making processes, especially in processes for recycling paper and board, and also in the textile, pulp and printing industries.

Description of Related Art

Energy requirements of manufacturing recycled-content paper are distinctly lower (about two-thirds lower) than for making new paper from wood (virgin-fiber paper), water requirements are only 15%, and water pollution is only about 5%. So it is environmentally beneficial to recycle paper.

Adhesives from self-adhesive labels, hotmelts, tacky coating constituents on recycled coated papers and cartons, etc., are an immense problem in the recycling process because they cannot be completely screened out despite ever greater deployment of mechanical cleaning resources. They constitute a key cause of what are known in the trade as "stickies" and "white pitch", the hydrophobic properties of which are responsible for their frequent deposition on hot and moving parts and in the wires and felts of papermaking machines and so they may lead to broken paper webs.

Products useful as passivating agents for treating adhesive contaminants such as stickies have been available for years. These dissolved products are said to render the surface of the tacky contaminants more hydrophilic and hence keep them more wettable, thereby reducing their affinity for hydrophobic surfaces, for example wires, felts and rolls.

Similarly, in the production of paper from wood and cellulose, there are organic components such as, for example, resinous fractions known as "pitch" which cause disruptive deposits during the process and lead to quality detriments on the part of the products.

WO 2011015297 discloses reducing the tackiness of stickies with a polymer dispersion comprising copolymers of (meth)acrylic acid.

Numerous documents describe polyesters as good dispersants which additionally modify the surface of materials and inhibit attachment of particles.

Polyesters formed from aromatic dicarboxylic acids, such as terephthalic acid or isophthalic acid, and diols, such as alkylene glycol, are well-known and have in particular been described for use as soil release polymers (SRPs) in laundry detergent and cleaning compositions.

DE-A-10 2007 051279 claims washable dye mixtures with nonionic polyesters and advertises their excellent coloring performance, especially in polar compositions, such as laundry detergents and dishwashing agents, coupled with minimal staining of textiles and surfaces.

DE 1 194 363 discloses a method of finishing and antistaticizing fibers or textiles with an aqueous solution of a polymerizable polyester obtained from polyhydric alcohols and polybasic carboxylic acids.

DE 10 2008 023 803 describes additives for laundry detergent and cleaning compositions obtained by polycondensing an aromatic dicarboxylic acid and/or $C_1$-$C_4$-alkyl esters thereof with ethylene glycol, optionally 1,2-propylene glycol, optionally polyethylene glycol having an average molar mass of 200 to 8000 g/mol, optionally $C_1$-$C_4$-alkyl polyalkylene glycol ethers having an average molar mass of 200 to 5000 for the polyalkylene glycol ether and optionally a polyfunctional compound, and advertises for example their solid consistency and hydrolysis stability. Explicitly disclosed polyesters are prepared using, for example, polyethylene glycol 6000 and a mixture of methyl polyethylene glycol 750 and methyl polyethylene glycol 2000.

DE 198 26 356 describes oligoesters obtained by polycondensing dicarboxylic acids or esters, ethylene glycol and/or propylene glycol, polyethylene glycol, a water-soluble addition product of an alkylene oxide onto $C_1$-$C_{24}$ alcohols and one or more polyols having 3 to 6 hydroxyl groups and used for example as soil release polymers in laundry detergents. Polyesters explicitly disclosed are obtained, for example, from dimethyl terephthalate, ethylene glycol, 1,2-propylene glycol, polyethylene glycol 1500, a mixture of methyl polyethylene glycol 750 and methyl polyethylene glycol 1820 and pentaerythritol.

U.S. Pat. No. 5,415,739 describes a method of reducing the tackiness of paper furnishes contaminated with adhesives, which comprises adding to the furnish a water-soluble terpolymer derived from polyethylene glycol in amounts >80% by weight, based on the terpolymer obtained from the reaction of phthalic acid or ester, a glycol and polyethylene glycol in the presence of antimony trioxide.

However, when these terpolymers described therein are used for detackification in the recycling operation, the result is unsatisfactory. Moreover, $Sb_2O_3$ is classed as a possible carcinogen and its use is undesirable.

SUMMARY

It is an object of the present invention to provide an environmentally friendly product with which the undesired adhesive contaminants in the paper recycling process can be efficiently eliminated or significantly reduced.

It was found that, surprisingly, the use of certain polyesters especially in paper- and boardmaking processes, especially in processes for recycling paper and board, and also in the textile, pulp and printing industries provides for effective modification of hydrophobic surfaces.

The present invention accordingly relates to the use of polyesters for increasing the surface tension and improving the hydrophilic behavior of hydrophobic surfaces, wherein said polyesters are obtainable by polymerization of a) one or more unsulfonated aromatic dicarboxylic acids and/or salts thereof and/or anhydrides thereof and/or esters thereof, and
b) ethylene glycol,
c) 1,2-propylene glycol, and
d) one or more polyalkylene glycols, and
e) one or more compounds of formula (1)

$$R^1O(CHR^2CHR^3O)_nH \qquad (1)$$

where
  $R^1$ is a linear or branched, saturated or unsaturated alkyl group of 1 to 22 carbon atoms, preferably methyl,
  $R^2$ and $R^3$ are each independently hydrogen or an alkyl group of 1 to 4 carbon atoms, preferably hydrogen and/or methyl, and
  n is from 1 to 50, preferably 2 to 40, more preferably 10 to 35 f) in the presence or absence of one or more crosslinking compounds having 3 to 6 functions capable of polycondensation, especially acid, alcohol or ester functions, with the proviso that said components d) are used in weight quantities <80%, based on the weight quantity of the polyesters obtained by the polymerization.

DETAILED DESCRIPTION OF A PREFERRED EMBODIMENT

In one preferred embodiment of the present invention, the transesterification and condensation of components a) to e) in the presence or absence of component f) takes place in the presence of transesterification and condensation catalysts of the prior art, for example titanium tetraisopropoxide/sodium acetate, dibutyltin oxide, or alkali metal or alkaline earth metal alkoxides.

In a greatly preferred embodiment of the present invention, the polyesters used according to the present invention are obtainable by polymerization of components a) to f) without further components.

In a further greatly preferred embodiment of the present invention, the polyesters used according to the present invention are obtainable by polymerization of components a) to e) without further components.

Preference for use as component a) is given to one or more compounds selected from terephthalic acid, phthalic acid, isophthalic acid, their anhydrides and the mono- and dialkyl esters with $C_1$-$C_6$ alcohols of these dicarboxylic acids.

Particular preference for use as component a) is given to one or more compounds selected from terephthalic acid, isophthalic acid and their dimethyl, diethyl, dipropyl and dibutyl esters.

Dimethyl terephthalate is greatly preferred as component a).

Preference for use as component d) is given to one or more compounds selected from the group consisting of polyethylene glycols having weight-average molecular weights of about 200 to 8000 g/mol, polypropylene glycols having weight-average molecular weights of about 200 to 8000 g/mol and polypropylene ethylene glycol having weight-average molecular weights of about 200 to 8000 g/mol.

Particular preference for use as component d) is given to one or more compounds selected from polyethylene glycols having weight-average molecular weights of about 1000 to 2000 g/mol.

Polyethylene glycol having a weight-average molecular weight of 1500 g/mol is greatly preferred as component d).

Preference for use as component e) is given to one or more compounds selected from one or more compounds from the group of one-sidedly endcapped polyalkylene glycols (end plugs), preferably polyethylene glycol monoalkyl ethers or poly[ethlyene glycol-co-propylene glycol] monoalkyl ethers having weight-average molecular weights of about 150 to 2000 g/mol. Particular preference for use as component e) is given to one or more compounds selected from polyethylene glycol monomethyl ethers having weight-average molecular weights of about 1050-1350 g/mol.

Polyethylene glycol monomethyl ether having a weight-average molecular weight of 1250 g/mol is greatly preferred as component e).

Preference for use as component f) is given to compounds selected from the group consisting of citric acid, malic acid, tartaric acid and gallic acid, 2,2-dihydroxymethylpropionic acid, pentaerythritol, glycerol, sorbitol, mannitol, 1,2,3-hexanetriol, benzene-1,2,3-tricarboxylic acid (hemimellitic acid), benzene-1,2,4-tricarboxylic acid (trimellitic acid) and benzene-1,3,5-tricarboxylic acid (trimesic acid).

Compounds selected from pentaerythritol and glycerol are particularly preferred for use as component f).

Pentaerythritol is greatly preferred for use as component f).

Preference is given to polyesters obtainable by polymerization of components a) to e) in the presence or absence of component f) in the following molar ratios, each based on 1 mol of component a):

0.2 to 0.8 mol, preferably 0.3 to 0.7 mol, more preferably 0.4 to 0.6 mol and most preferably 0.5 to 0.6 mol of component b), and 1.0 to 2.0 mol, preferably 1.1 to 1.6 mol, more preferably 1.2 to 1.5 mol and most preferably 1.3 to 1.4 mol of component c), and 0.05 to 2.0 mol, preferably 0.10 to 1.0 mol, more preferably 0.2 to 0.8 mol and most preferably 0.25 to 0.5 mol of component d), and 0.01 to 1.0 mol, preferably 0.05 to 0.8 mol, more preferably 0.1 to 0.5 mol and most preferably 0.11 to 0.3 mol of component e), and in the presence of 0.00001 to 1.0 mol, preferably 0.00001 to 0.5 mol, more preferably 0.0001 to 0.01 mol and most preferably 0.0002 to 0.01 mol, of component f) or in the absence of component f).

The polyesters generally have weight-average molecular weights in the range from 700 to 50 000 g/mol, preferably in the range from 800 to 25 000 g/mol, more preferably in the range from 1000 to 15 000 g/mol and even more preferably in the range from 1200 to 12 000 g/mol. Weight-average molecular weight is determined by size exclusion chromatography in aqueous solution by using a calibration with narrowly distributed sodium polyacrylate as standard.

The polyesters of the present invention are preferably nonionic polyesters.

In one preferred embodiment, the polyesters used according to the present invention contain no residual monomers selected from polyethylene glycols and methyl polyethylene glycols having weight-average molecular weights below 1000 g/mol, which are toxicologically and ecotoxicologically undesirable.

In one preferred embodiment of the polyesters used according to the present invention, the weight fraction of residual monomers in the polyester of components a) to e) and f) used for the polymerization is in each case <1% based on the weight of the polyester.

In a further preferred embodiment, the polyesters used according to the present invention are used in the form of an aqueous dispersion in which the polyesters used according to the invention are present in concentrations of 10% to 30% by weight based on the final aqueous dispersion, more preferably of 15% to 25% by weight and most preferably in a concentration of 20% by weight, based on the final aqueous dispersion.

The polyesters described above modify surfaces of materials having low surface energy and pronounced hydrophobic behavior, such as polyester fabric, felts, wires and rolls, such that, by adsorption of the polyesters described above, the surface tension is increased and the surfaces become more hydrophilic.

Thus, in the presence of the polyesters used according to the present invention, the hydrophobic surfaces of the adhesive contaminants present in the pulp of the paper recycling process become more hydrophilic and the tendency for the tacky particles to deposit on hydrophobic surfaces, for example wires, felts and rolls, is reduced.

The polyesters used according to the present invention can also modify hydrophobic surfaces, for example wires, felts and rolls, and endow them with more hydrophilic properties, which minimizes the deposition tendencies of stickies.

The use which the present invention provides for the polyesters described above further effects a significant improvement in the wettability of hydrophobic surfaces, as of polyester fabrics for example.

It is further advantageous that the polyesters described above possess outstanding dispersing power. Using the polyesters described above it is possible to produce aqueous dispersions of hydrophobic fibers, as of polyester fibers or glass fibers for example.

It is similarly advantageous to use the polyesters described above for improving the printing behavior of oil-based printing inks on hydrophobic surfaces.

In the use of the esters described above, they are added in the papermaking process or in the paper recycling process to the paper fiber furnish as a dispersion in amounts of preferably 200 to 1000 g of polyester (100% active) per metric ton of dry paper fiber to form a homogeneous dispersion and take effect therein. The polyesters of the present invention are added in the form of an aqueous dispersion, preferably as a 20% strength aqueous dispersion. The specified quantity is based on 100% polyester.

The polyesters described above can also be used during the papermaking or paper recycling process by spraying surfaces, as of rolls or felts, for example, with aqueous solutions containing the polyesters described above. These aqueous solutions preferably contain the polyesters used according to the present invention in weight quantities of 0.01 to 0.05%, based on the sprayable solution.

The examples which follow are provided for further elucidation, but not limitation of the invention. Unless explicitly stated otherwise, all percentages are by weight (wt %).

Examples

Preparation of Inventive Polyester 1

A 1-L four-neck flask equipped with KPG stirrer, internal thermometer, Vigreux column, distillation bridge, $N_2$ supply (5 l/h) and Anschütz-Thiele adapter was initially charged with 164.4 g (0.85 mol) of dimethyl terephthalate, 87.9 g (1.155 mol) of 1,2-propanediol, 29.5 g (0.475 mol) of ethylene glycol, 1.14 g (0.008 mol) of pentaerythritol and 0.75 g (0.0009 mol) of sodium acetate and the reaction mixture was subsequently heated up to 60° C. internal temperature under $N_2$ blanketing (5 l/h), with stirring at a stirrer speed of 50-100 rpm. The $N_2$ line was closed and then 0.2 g (0.0007 mol) of titanium tetraisopropoxide was added. Stirrer speed was subsequently raised to 300 rpm and the batch was heated up to an internal temperature of 150° C. in the course of 2 h and to an internal temperature of 200° C. in the course of a further 2 h. The $N_2$ line was reopened at an internal temperature of 170° C. The reaction mixture was heated at 200° C. for 2 h and the methanol formed was distilled off and condensed in an ice-cooled receiver. The reaction mixture was subsequently cooled down to room temperature and 328.7 g (0.219 mol) of polyethylene glycol 1500 and 137.8 g (0.11 mol) of polyethylene glycol monomethyl ester 1250 were added. The mixture was heated up to 215° C. internal temperature under $N_2$ blanketing (5 l/h) with stirring at a stirrer speed of 300 rpm, the $N_2$ line was closed and the pressure was reduced to 150 mbar in the course of 2 h and to 10 mbar in the course of a further 2 h while glycol was distilled off. After supplementary condensation at 215° C. and 10 mbar for 2 h the melt was cooled down to 140-150° C. The system was then vented with $N_2$ and the hot melt was discharged. A solidified beige polymer melt was obtained.

Preparation of Comparative Polyester 1

A 1-L four-neck flask equipped with KPG stirrer, internal thermometer, Vigreux column, distillation bridge, $N_2$ supply (5 l/h) and Anschütz-Thiele adapter was initially charged with the following starting materials: 41.53 g (0.25 mol) of dimethyl terephthalate, 27.13 g (0.437 mol) of ethylene glycol, 362.5 g (0.29 mol) of methyl polyethylene glycol 1250, 0.5 g of sodium acetate anhydrous (NaOAc) and 0.13 g of titanium tetraisopropoxide (Ti(iPr)$_4$).

The mixture was heated to about 160° C. (about 15-20 min) and the methanol produced was distilled off. During the distillation, the temperature was gradually raised to 210° C. in the course of 3 h ($N_2$ (5 l/h) was passed over from an internal temperature of about 180° C.). Methanol was distilled off until the head temperature was below 55° C. (min. 4 h/210° C. subsequent stirring). This was followed by cooling down to 195° C., pressure reduction to 10 mbar in the course of one hour and distillative removal of glycol (head temperature up to about 150° C.). This was followed by supplementary condensation at 10 mbar/195° C. for 4 h (the head temperature was below 75-80° C. at the end). The vacuum was reduced to 5 mbar for 5 min and then the apparatus was vented with $N_2$ (oil bath below flask, $T_i$ 185-195° C.) and the hot melt was discharged onto a metal tray.

Measurement of Surface Tensions:

TABLE 1

Surface tension of untreated polyester fiber X (polyester fiber X is not made of the inventive polyesters) and of a polyester fiber X treated with a 0.04 wt % aqueous dispersion of inventive polyester 1 and of comparative polyester 1.

| Polyester fiber X | Surface tension [mN/m] |
| --- | --- |
| untreated | 45.5 |
| inventive polyester 1 | 61.2 |
| comparative polyester 1 | 53.3 | instrument: SITA Pro Line T15 bubble pressure tensiometer setting: Auto Mode bubble life: 15 ms to 15 s measurement: at 15 s sample solution: 0.04 wt % inventive polyester 1 or comparative polyester 1 in distilled water temperature: 20° C.

Measurement of Deposits:

TABLE 2

Deposition of a paper stock which contains adhesive material on a polyester wire a) having an unmodified surface, b) modified with inventive polyester 1, c) modified with comparative polyester 1

| Sample | Polyester concentration [wt %] | Polyester wire before deposition [g] | Polyester wire after 15 min contact time [g] | Weight increase [mg] | Reduction in deposit [%] |
|---|---|---|---|---|---|
| a (control) | 0 | 308.7 | 315.9 | 7.2 | 0 |
| b (inventive polyester 1) | 0.1 | 311.0 | 311.7 | 0.7 | 90.3 |
| c (comparative polyester 1) | 0.1 | 305.6 | 310.2 | 4.6 | 36.1 |

The polyester wire used is not made of the inventive polyesters.

An adhesive label consisting of 75 g of paper and 25 g of an acrylic pressure-sensitive adhesive which in turn consists of 80 wt % of poly(2-ethylhexyl acrylate-acrylic acid) copolymer and 20 wt % of styrene-butadiene copolymer is applied to a 10 g pulp sheet from bleached birchwood. This sheet has 750 ml of tap water added to it and is stirred at 50° C. for 2 minutes in a mixer at a high speed to form a homogeneous paper stock. The mixture obtained is bulked with tap water to an overall volume of 1000 ml and split into 200 ml samples.

Inventive polyester 1 and comparative polyester 1 are each made up into 0.1 weight percent solutions with 100 ml of tap water in each case. 3 polyester wires of the Primobond SF brand (Heimbach), measuring 30×50 mm, are weighed out to the nearest decimal. Each polyester wire is dipped for 10 seconds at room temperature either into pure tap water or into the 0.1 weight percent inventive polyester 1 solution or into the 0.1 weight percent comparative polyester 1 solution for 10 seconds at a time and then removed from the tap water or the 0.1 weight percent solutions and placed into an empty 400 ml glass beaker. The 400 ml glass beakers are each filled with 200 ml of paper stock. Each polyester wire, which is either untreated (tap water, control) or else treated (with inventive polyester 1 or comparative polyester 1) in the above-described manner, is placed into the 200 ml sample a), b) or c) and the sample is stirred at 200 revolutions/minute for 15 minutes. The polyester wires are removed from the samples, rinsed off with cold water, air dried and weighed.

The results show that the use of inventive polyester 1 causes a distinctly smaller amount of adhesive to adhere to the polyester wire (90.3% improvement), compared with the untreated polyester wire (0% improvement) or compared with the use of comparative polyester 1 (36.1% improvement).

What is claimed is:

1. A polyester capable of being used for increasing surface tension and improving hydrophilic behavior of hydrophobic surfaces, wherein said polyester is obtained by polymerization of
   a) one or more unsulfonated aromatic dicarboxylic acids and/or salts thereof and/or anhydrides thereof and/or esters thereof, and
   b) ethylene glycol,
   c) 1,2-propylene glycol, and
   d) one or more polyalkylene glycols, and
   e) one or more compounds of formula (1)

$$R^1O(CHR^2CHR^3O)_nH \quad (1)$$

where
   $R^1$ is a linear or branched, saturated or unsaturated alkyl group of 1 to 22 carbon atoms,
   $R^2$ and $R^3$ are each independently hydrogen or an alkyl group of 1 to 4 carbon atoms, and
   n is from 1 to 50,
   f) in the presence or absence of one or more crosslinking compounds having 3 to 6 functions capable of polycondensation, with the proviso that said components d) are used in weight quantities <80%, based on the weight quantity of the polyesters obtained by polymerization,
   wherein the weight fraction of residual monomers in the polyester due to components a) to e) and optionally f) is <1% based on the weight of the polyester.

2. The polyester as claimed in claim 1, wherein the polymerization comprises transesterification and condensation of components a) to e) in the presence or absence of component f) in the presence of one or more transesterification and condensation catalysts.

3. The polyester as claimed in claim 1, wherein one or more compounds selected from terephthalic acid, phthalic acid, isophthalic acid, their anhydrides and the mono- and dialkyl esters with $C_1$-$C_6$ alcohols of dicarboxylic acids are used as component a).

4. The polyester as claimed in claim 1, wherein one or more compounds selected from polyethylene glycols having weight-average molecular weights of about 200 to 8000 g/mol, and/or polypropylene glycols having weight-average molecular weights of about 200 to 8000 g/mol and polypropylene ethylene glycol having weight-average molecular weights of about 200 to 8000 g/mol are used as component d).

5. The polyester as claimed in claim 1, wherein compounds selected from the group consisting of citric acid, malic acid, tartaric acid, gallic acid, 2,2-dihydroxymethylpropionic acid, pentaerythritol, glycerol, sorbitol, mannitol, 1,2,3-hexanetriol, benzene-1,2,3-tricarboxylic acid (hemimellitic acid), benzene-1,2,4-tricarboxylic acid (trimellitic acid) and benzene-1,3,5-tricarboxylic acid (trimesic acid) are used as component f).

6. The polyester as claimed in claim 1, which is obtained by polymerization of components a) to e) in the presence or absence of component f) in the following molar ratios, each based on 1 mol of component a):
   0.2 to 0.8 mol of component b), and
   1.0 to 2.0 mol of component c), and
   0.05 to 2.0 mol of component d), and
   0.01 to 1.0 mol of component e), and
   in the presence of 0.00001 to 1.0 mol of component f) or in the absence of component f).

7. The polyester as claimed in claim 1, wherein the polyester has a weight-average molecular weight in the range from 700 to 50 000 g/mol.

8. An aqueous dispersion comprising 10% to 30% by weight based on the final aqueous dispersion of a polyester obtained by polymerization of
   a) one or more unsulfonated aromatic dicarboxylic acids and/or salts thereof and/or anhydrides thereof and/or esters thereof, and
   b) ethylene glycol,
   c) 1,2-propylene glycol, and d) one or more polyalkylene glycols, and
e) one or more compounds of formula (1)

$$R^1O(CHR^2CHR^3O)_nH \quad (1)$$

where
$R^1$ is a linear or branched, saturated or unsaturated alkyl group of 1 to 22 carbon atoms,
$R^2$ and $R^3$ are each independently hydrogen or an alkyl group of 1 to 4 carbon atoms, and
n is from 1 to 50,
f) in the presence or absence of one or more crosslinking compounds having 3 to 6 functions capable of polycondensation,
with the proviso that said components d) are used in weight quantities <80%, based on the weight quantity of the polyesters obtained by polymerization.

9. A method comprising adding a polyester as claimed in claim 1 in a papermaking process or in a paper recycling process to paper fiber furnish as a dispersion in an amount to form a homogeneous dispersion and take effect therein.

10. A method for enhancing dispersibility of hydrophobic fibers comprising adding and/or spraying the polyester of claim 1 on the fibers as a dispersion.

11. A method improving printing behavior of oil-based printing inks on hydrophobic surfaces comprising adding and/or spraying the polyester of claim 1 on the hydrophobic surfaces.

12. The polyester as claimed in claim 1, wherein $R^1$ is methyl.

13. The polyester as claimed in claim 1, wherein $R^2$ and $R^3$ are each independently hydrogen and/or methyl.

14. The polyester as claimed in claim 1, wherein the 3 to 6 functions capable of polycondensation are acid, alcohol or ester functions.

15. The polyester as claimed in claim 1, wherein component e) has a weight-average molecular weight of about 150 to 2000 g/mol and is selected from the group consisting of polyethylene glycol monoalkyl ethers and poly[ethylene glycol-co-propylene glycol] monoalkyl ethers.

16. The polyester as claimed in claim 1, which is obtained by polymerization of components a) to e) in the presence or absence of component f) in the following molar ratios, each based on 1 mol of component a):
0.5 to 0.6 mol of component b), and
1.3 to 1.4 mol of component c), and
0.25 to 0.5 mol of component d), and
0.11 to 0.3 mol of component e), and
in the presence of 0.0002 to 0.01 mol of component f) or in the absence of component f).

17. A method for increasing surface tension and improving hydrophiolic behavior of a hydrophobic surface comprising applying a polyester as claimed in claim 1 to the surface.

18. A method for increasing surface tension and improving hydrophiolic behavior of a hydrophobic surface comprising applying the aqueous dispersion as claimed in claim 8 to the surface.

19. The method of claim 9, wherein said amount is 200 to 1000 g of polyester (100% active) per metric ton of dry paper fiber.

* * * * *